United States Patent [19]

Simcoe et al.

[11] Patent Number: 4,970,718

[45] Date of Patent: Nov. 13, 1990

[54] APPARATUS FOR SUPPLYING CHANNEL-CONTROL SIGNALS AND MAINTENANCE SIGNALS IN A SERIAL DATA CONCENTRATOR SYSTEM

[75] Inventors: Robert J. Simcoe, Westborough; Raymond G. Stephany, Ashland; Gregory M. Waters, Waltham, all of Mass.

[73] Assignee: Digital Equipment Corporation, Maynard, Mass.

[21] Appl. No.: 318,606

[22] Filed: Mar. 3, 1989

[51] Int. Cl.[5] .......................... H04J 3/00; H04B 17/00
[52] U.S. Cl. ....................................... 370/77; 370/112; 370/100.1; 371/5.1
[58] Field of Search ........................ 370/77, 112, 105.4, 370/105.5, 15, 85.13, 47, 100.1, 105.1, 105.2, 105.4; 375/109; 371/5, 22, 15, 47

[56] References Cited

U.S. PATENT DOCUMENTS

| | | | |
|---|---|---|---|
| 4,230,913 | 10/1980 | Brothers et al. | 379/246 |
| 4,713,810 | 12/1987 | Chum | 371/5.1 |
| 4,742,518 | 5/1988 | Shedd | 371/5.1 |
| 4,766,590 | 8/1988 | Hamada et al. | 370/85 |

OTHER PUBLICATIONS

Lombaerde, "Fiber-Optic Multiplexer Clusters Signals from 16 RS-232-C Channels", *Electronics*, Mar. 24, 1982.

*Primary Examiner*—Douglas W. Olms
*Assistant Examiner*—Christopher O. Edwards
*Attorney, Agent, or Firm*—Nutter, McClennen & Fish

[57] ABSTRACT

A data link (1000) multiplexes a large number of concurrently operating channel onto a single pair of fiber-optic cables (10 and 1010). A receiver (1004A) at one end of the links determines whether it is in sychronism with the signals that it receives over one of the cables (1010), and a transmitter (1002A) includes the result of that determination with the data that it sends to the other end if the link so that devices at the other end of the link can be caused to log off in response to extended lapses in synchronism at the first end. Each transmitter also sends an error count to the other end, and is responsive to a mode signal from the other end to reduce its signal power, so that maintenance personnel can perform many testing and diagnostic procedures from a single end of the link. A single integrated-circuit chip (1005A) receives data serially from a modularly expandable shift register (208) that has recieved the data in parallel, and the chip sends the data serially in a "reverse" order so that expansion of the shift-register length requires no change in the chip.

30 Claims, 8 Drawing Sheets

APPARATUS FOR SUPPLYING CHANNEL-CONTROL SIGNALS AND MAINTENANCE SIGNALS IN A SERIAL DATA CONCENTRATOR SYSTEM

RELATED APPLICATION

This application is related to the U.S. Pat. application of Robert Joseph Simcoe and Gregory Monford Waters entitled "Technique for Organizing and Coding Serial Binary Data from a Plurality of Data Lines for Transmission Over a Single Transmission Line," filed Mar. 4, 1988, U.S. application Ser. No. 07/164,392 (the "related application"), which is hereby incorporated herein by reference.

1. Field of the Invention

The invention relates generally to the field of systems for transmitting digital data and, in particular, to techniques for supplying control signals and maintenance signals in a communications system which uses a pair of serial data concentrators for two-way communication.

2. Background of the Invention

When each of a number of computers or peripherals at one location must communicate with a corresponding one of a number of such devices at another location a short distance away, one can simply provide a separate conductor or pair of conductors for each signal to be conducted. In such a short-distance data link, cable cost is relatively low, and link maintenance and fault diagnosis are relatively simple. As link length increases, however, the detection of defective operation and the diagnosis of its causes become more complicated. Symptoms at one end of the link may affect the diagnostic meaning that should be attributed to symptoms at the other end of the link, but the remoteness of one end of the link from the other end of the link may necessitate placing maintenance personnel at both ends for diagnostic purposes. Thus, longer-length data links can be more difficult to maintain.

In addition to maintenance difficulties, long links result in cable costs that are almost directly proportional to link length. For this reason, concentrator/-deconcentrator systems are employed to reduce the number of conductors needed. A serial data concentrator/deconcentrator system uses a multiplexer to concentrate data from a plurality of high-speed-data input lines and to transmit those data over a single transmission line to a deconcentrator, which uses a demultiplexing unit to place the data on a plurality of high-speed-data output lines.

Each high-speed-data input line, together with its associated high-speed-data output line, may be a part of a serial binary data interchange circuit, such as the circuits defined in Electronics Industry Association ("EIA") standards RS-232-C, RS-422-A, and RS-423-A. Such a serial binary data interchange circuit comprises a first high-speed serial binary data line leading from one unit of a computer system (designated herein as "unit X") to another unit of the computer system (designated herein as "unit Y"). It also includes a second high-speed serial binary data line leading back from unit Y to unit X. With two high-speed serial data lines—one in each direction—unit X is able to send high-speed data to unit Y, and vice versa.

A communications system may use one concentrator/deconcentrator system, such as the system described in the related application, to concentrate a plurality of high-speed serial binary-data lines leading from a plurality of units at a first location to a plurality of units at a second location. The communications system may also use another concentrator/deconcentrator system to concentrate the high-speed serial binary data lines leading from the units at the second location to the units at the first location, thus forming a complete serial binary data interchange circuit for each of the plurality of pairs of units. With two concentrator/deconcentrator systems arranged in that way, the serial binary data interchange circuits can be extended over a considerable distance by using the single transmission link of each concentrator/deconcentrator system to replace the plurality of high-speed serial data lines that would be necessary if a concentrator/deconcentrator system were not used.

The EIA standards for serial binary data interchange circuits noted above provide for various control signals to be used with each serial binary data interchange circuit. For each high-speed serial data line leading from a unit X to a unit Y, the EIA standards provide for as many as six control signals leading in one direction (for example, from unit X to unit Y) and as many as three control signals leading in the other direction (for example, from unit Y to unit X). Possibly because the EIA standards were developed for applications calling for the serial data interchange lines to connect computer system units at essentially the same location—that is, units separated by a distance of the order of 50 to 100 feet—the EIA standards assume that each control signal will have its own line. As a result, units designed to satisfy the EIA standards have up to six control lines in one direction, and up to three control lines in the other direction, for each pair of high-speed data lines making up a serial binary data interchange circuit. These multiple control lines in each direction should also be concentrated by a concentrator/deconcentrator system for transmission over a distance.

Because the direction in which the greater number of control signals travels is often unknown at the time a paired concentrator/deconcentrator system is manufactured, each end of a paired concentrator/deconcentrator system should be able to transmit to the other end the signals from up to six control signal lines, in addition to the signal from the high-speed serial binary data line, for each serial binary data interchange circuit.

Although multiplexing the control signals solves the problem of having too many separate lines extending over a long distance, it creates another practical problem of wire congestion at the multiplexing unit and at the demultiplexing unit in a concentrator/deconcentrator system. The congestion problem is doubled when the multiplexing unit and demultiplexing unit at the same location are implemented on the same VLSI chip; there is a practical limit to the number of VLSI terminals.

If the multiplexer and demultiplexer are to be provided on the same chip, the semiconductor chip at each end of the communications system must be designed to accommodate twelve control signals for each serial data interchange circuit—up to six control signals for the high-speed serial data line from unit X to unit Y, and up to six control signals for the high-speed serial data line from unit Y to unit X. If such a communications system handles, say, sixteen serial binary data interchange circuits, the semiconductor chip at each end of the system must be able to accommodate 192 control signals (96 control signals leading to the multiplexing unit and 96 control signals leading from the demultiplexing unit) to accommodate the EIA standards. Each such chip must also accommodate sixteen high-speed data input lines and sixteen high-speed data output lines. Of course, any practical semiconductor chip will also need to have various other input and output, terminals. While chip packages providing such large numbers of pins are available, these packages can be both expensive and inconvenient to use.

In implementing such a concentrator/deconcentrator system, it is of course desirable to be able to employ general-purpose interface circuitry that is largely independent of the configuration and number of computer systems for which it provides communication. It is also desirable to realize as much of the circuitry as possible in a single integrated circuit. If the system is to accommodate, say, sixteen pairs of computer systems, however, the relatively large number of signal lines that may be implemented under EIA standards for each computer system (i.e. up to fourteen per computer system) results in a number of circuit connections that would make the resultant general-purpose circuitry quite expensive if implemented in a large-scale integrated circuit.

SUMMARY OF THE INVENTION

According to one aspect of the present invention, the transmitter at one end of a data link is a data concentrator that operates in a manner that enables it to be implemented so that most of the functions for a large number of computer systems can be implemented in a single large-scale integrated circuit with a relatively low pin count while most of the of signal lines from those computer systems can be connected to a separate shift register connected to the integrated circuit by only a few lines. The shift register can be readily expandable by addition of component shift registers connected to it in series.

The data concentrator transmits its data in frame periods to a deconcentrator that receives the transmitted data and forwards the data transmitted during a single frame period in parallel. The data concentrator includes a parallel-input shift register that has a serial output port, a plurality of stages, and a parallel input port associated with each stage. The input ports of the shift register receive the signals from most of the input lines of the computer systems with which the concentrator is used.

Reversing circuitry connected to receive the serial output of the parallel-input shift register operates the parallel-input shift register as a parallel-to-serial converter, causing it to load in the values of the computer-system signals at the parallel input ports and to advance the resulting contents of the shift register so as thereby to transfer those contents to the reversing means. The reversing means then transmits the received contents serially to a deconcentrator in an order within a frame period that is generally reversed from the order of the input ports at which the parallel-input shift register received those contents. By transmitting the contents in this reverse order, the length of the shift register can be lengthened or shortened by adding or removing component shift registers without requiring a change in the operation of the reversing circuitry in order to maintain the correspondence between the shift-register input ports and corresponding deconcentrator output ports. The reversing circuitry can be provided on a single chip whose operation is independent, within limits, of the length of the shift register.

According to another aspect of the invention, the transmitter at one end of the link sends diagnostic information to the other end of the link together with the data so that many diagnostic operations can be performed without the need to place repair personnel at both ends of the data link. Specifically, a receiver at one end of the data link includes means for determining whether it is in synchronism with the transmitter signal that it receives over a link signal conductor, and it generates a synchronism signal that represents the result of that determination. A transmitter is disposed at the same side of the link as the receiver for transmitting a transmitter signal containing transmission data over a signal conductor. The transmitter is responsive to the synchronism signal to include in the transmitter signal a synchronism-indicating message that indicates whether the receiver is synchronism. In that way, a similar transmitter-receiver unit at the other end of the link is informed of the synchronism state of the first end of the link.

This feature enables the link to increase data security. The receivers at both ends of the link, of course, generate receiver signals by which they forward to some destination at least a part of the data in the transmitter signals that they receive. To increase data security, each receiver can be arranged to replace the transmitter-signal data that the receiver signal usually contains with preselected interrupt data both when the receiver finds itself out of synchronism for a predetermined length of time and when the synchronism-indicating message indicates that the receiver at the other end has been out of synchronism for a predetermined length of time. This interrupt data is symptomatic of a link interruption, and devices that receive the receiver signal will ordinarily respond to such interrupt data by logging off.

According to another aspect of the invention, each transmitter-receiver includes a hard-error-count circuit, which keeps track of the number of occurrences of lapses of synchronization that meet certain criteria. According to this aspect of the invention, the transmitter is responsive to the count in the hard-error-count circuit to include a message indicative thereof in the transmitter signal that it sends. This provides further diagnostic information at the other end of the link, thereby reducing the need to have diagnostic personnel stationed at both ends of the data link.

Another aspect of the invention provides repair, maintenance, and installation personnel with further information useful for testing the link. According to this aspect of the invention, the transmitter can be placed in a low-power mode, in which it transmits its signal with a power lower than that employed in normal operation. If the receiver at the other end of the link remains in synchronism when the transmitter is operating in its low-power mode, maintenance personnel can have a degree of confidence that the link should operate reliably at its regular power level. In order to provide this capability to personnel at a single end of the link, the transmitter at the other end of the link is operable to include in its transmitter signal a mode message, which directs the transmitter at the other end to operate in either the regular mode or the low-power mode. Preferably, the transmitter-receiver further includes a "loopback" capability, by which it can respond to a loopback message in the signal that it receives to feed its receiver signal back into its transmitter. This enables maintenance personnel at the other end of the link to compare the data sent with the data received.

BRIEF DESCRIPTION OF THE DRAWINGS

These and further features and advantages are described below by reference to the accompanying drawings, in which.

DETAILED DESCRIPTION OF AN ILLUSTRATIVE EMBODIMENT

One embodiment of the invention is used with a pair of fiber-optic concentrator/deconcentrator systems such as the system described in the related application. One such system leads from location A to location B. The other such system leads from location B to location A. In the following description any unit at location A is identified by the suffix "A" after its reference number, and any unit at location B is identified by the suffix "B." Likewise, any signal which originates at location A (even when that signal is present at location B) is identified by the suffix "A," and any signal which originates at location B (even when that signal appears at location A) is identified by the suffix "B."

Figure 1:
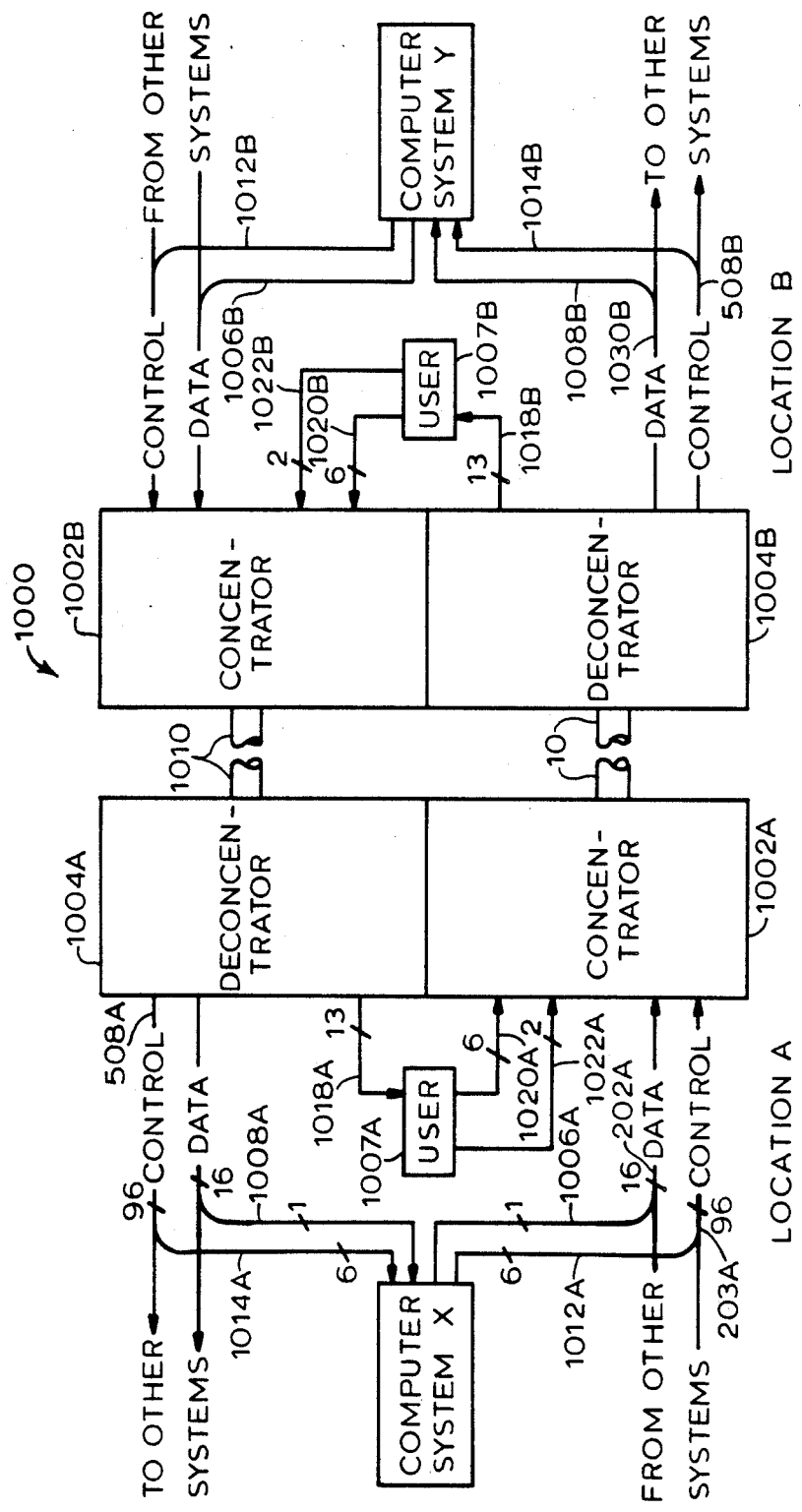
FIG. 1 is a simplified block diagram of a data communications system in which a plurality of serial binary data interchange circuits are carried by paired concentrator/deconcentrator systems between a first location and a second location.

FIG. 1 depicts a paired fiber-optic communications system 1000 for providing communications between a plurality of computer systems such as system X at location A and a corresponding plurality of computer systems such as computer system Y at location B. A concentrator 1002A at location A receives transmission data from the computer systems, and it includes a transmitter that generates an optical transmitter signal containing the transmission data and transmits that signal over a fiber-optic cable 10. A deconcentrator 1004B includes a receiver that receives the transmitter signal and forwards the contents thereof by means of electrical receiver signals to the computer systems at location B. Similar elements 1002B, 1004A and 1010 provide communication in the other direction.

Without the interposition of communications system 1000, the data transferred from computer system X to computer system Y would propagate along a single high-speed data line 1006A, which appears at location B as line 1008B. Similar single high-speed lines from other computer systems join line 1006A to make up lines 202A, which would connect directly to lines 1030B, of which line 1008B is a part. Although each computer system sends its data over a single line, certain lower-speed control information may also be sent, in accordance with Electronics Industry Association standards, by a plurality of lines for each system, such as six lines 1012A at location A that would continue as corresponding lines 1014B at location B if communications system 1000 were not interposed. Links 1012A join similar lines from other systems to make up lines 203A. Lines 203 would continue at location B as lines 508B, which include lines 1014B that lead to computer system Y For a computer system that can accommodate sixteen computer systems at each location, the number of parallel lines would be $7 \times 16 = 112$ for signals passing from location A to location B. The communications system 1000 is also interposed in the same number of lines carrying signals in the opposite direction, so the total number of lines carrying information between computer systems is 224. The communications system 1000 replaces all of these lines with two fiber-optic cables 10 and 1010, i.e., with a single cable in each direction. These cables additionally carry signals that users 1007A and B employ to control the system 1000. Lines 1020A and B, 1022A and B, and 1018A and B carry these signals. The "users" are typically machines that control link operation and form no part of the present invention.

Lines 1018 A and B, 1020A and B, and 1022A and B together consist of twenty-nine more lines at each location. In addition to power and other life-support terminals, therefore, the system hardware at each end must provide 253 terminals if the communications system 1000 is actually to serve sixteen pairs of computer systems.

However, the system does not always have to serve that many computer systems. In order to put as much of the system hardware as possible on a single standard chip, but to avoid providing many more terminals than are required by the number of computer systems actually used, the illustrated embodiment employs the organization depicted in FIGS. 2, 2A and 2B.

Figure 2:
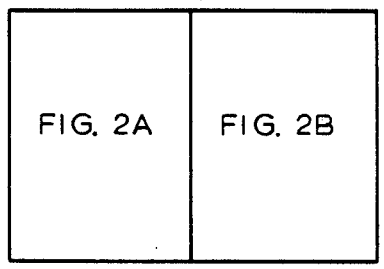
FIGS. 2, 2A and 2B together constitute a more-detailed schematic block diagram of the paired concentrator/deconcentrator system depicted in FIG. 1.
Figure 2A:
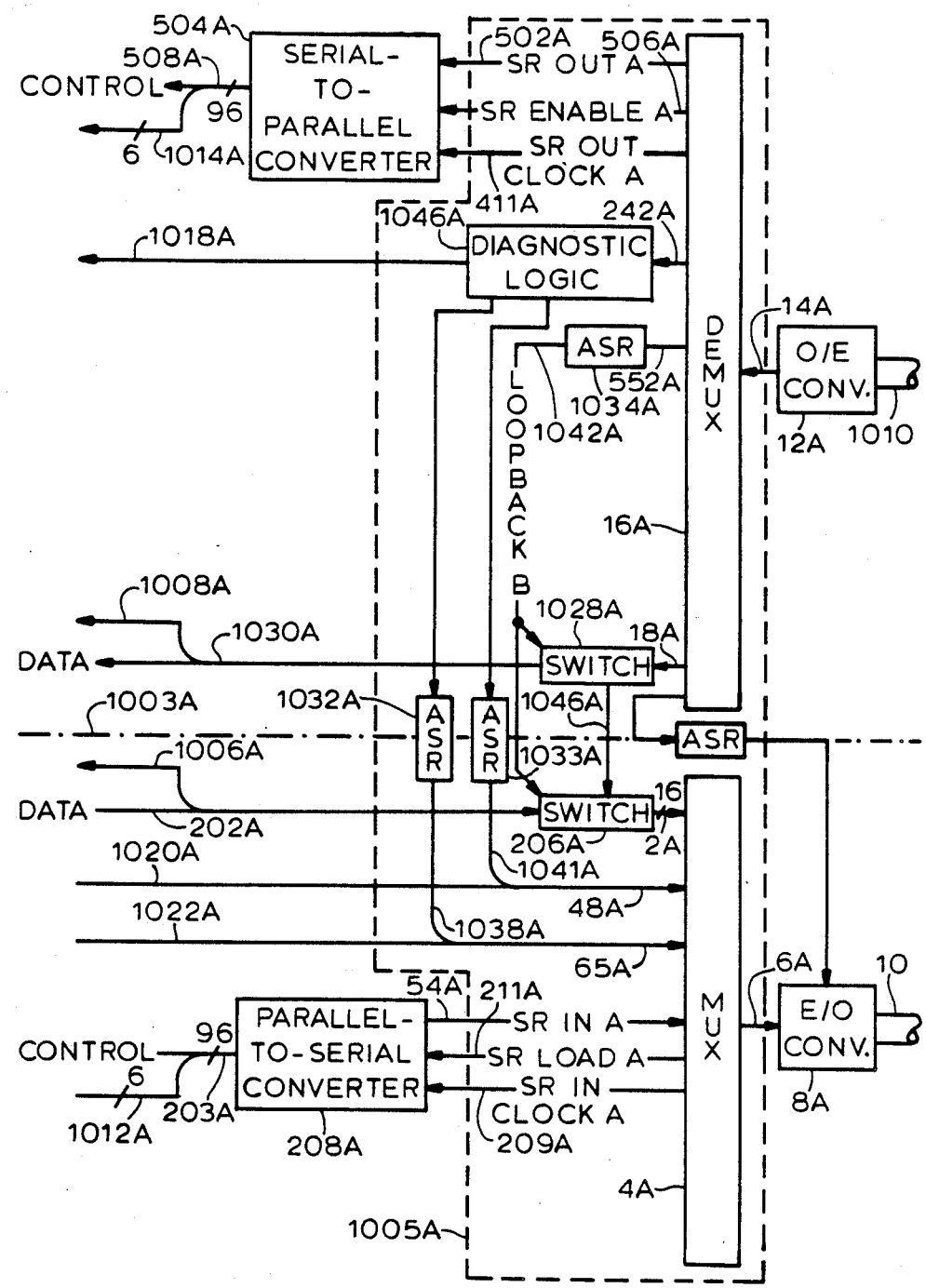
Figure 2B:
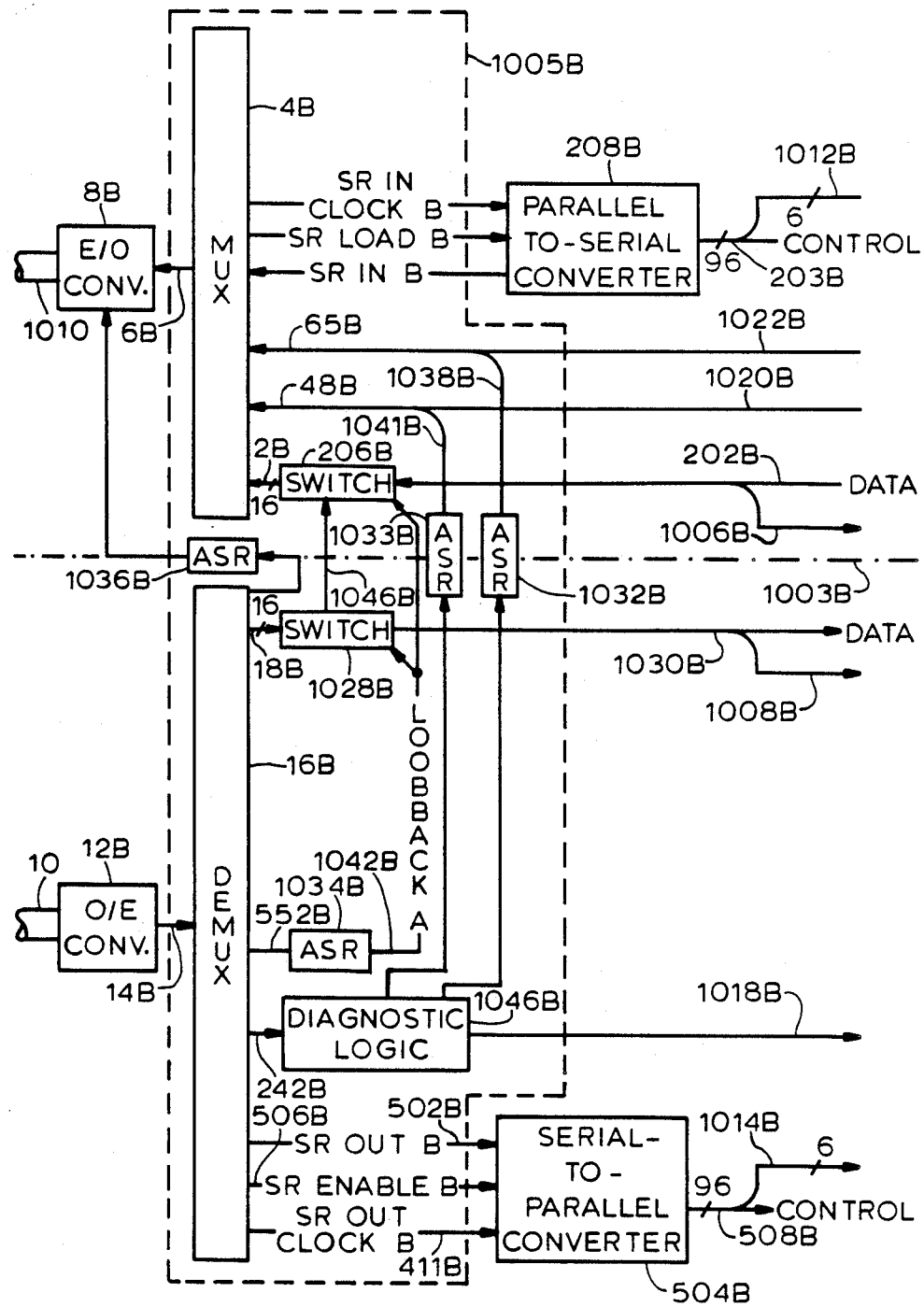

FIG. 2 shows the relationship of FIGS. 2A and 2B, which together depict in more detail the communications system 1000 of FIG. 1. The part of the communications system at location A is depicted in FIG. 2 with a dot-and-dash line of demarcation 1003A between the transmitting and receiving portions. FIG. 2B depicts identical circuitry at location B, so the following description referring to FIG. 2A will also serve to describe the circuitry of FIG. 2B.

The circuitry for performing the majority of the transmitting and receiving functions resides on a single main concentrator/deconcentrator chip 1005A. For transmission, for instance, this chip performs most of the function of sampling the signals from the plurality of input lines, organizing the samples, and transmitting them on a single electrical line 6A to an electrical-to-optical converter 8A for transmission over fiber-optic cable 10. An optical-to-electrical converter 12B in FIG. 2B, which forms part of the receiver at its location, receives the optical signals on line 10 and converts the optical signals to electrical signals on a single line 14B that leads to an integrated circuit 1005B that is identical to circuit 1005A and contains the remainder of the receiver.

However, chip 1005A is connected directly to only forty-one of the 233 lines mentioned above. The 192 input and output control lines 203A and 508A are instead connected to separate shift registers 208A and 504A, which chip 1005A operates as parallel-to-serial and serial-to-parallel converters, respectively.

Through the use of shift register 208A, the number of lines to which chip 1005A must be connected in order to receive the control information that it is to transmit is reduced from the ninety-six lines 203A to three lines 54A, 209A and 211A. Line 54A conducts the serial output SR IN A from shift register 208A to chip 1005A, while chip 1005A generates signals SR LOAD A and SR IN CLOCK A on lines 211A and 209A to operate shift register 208A as a parallel-to-serial converter. Specifically, shift register 208A samples the line-203A signals in parallel on each pulse of SR IN CLOCK A that occurs while SR LOAD A is asserted. Then, when SR LOAD A is deasserted, pulses of SR IN CLOCK A cause the sampled data to be transferred serially in SR IN A on line 54A to a multiplexing unit 4A in main concentrator/deconcentrator chip 1005A. The multiplexing unit 4A additionally samples the signals on other input lines 202A, 1020A, and 1022A, organizes the samples into frames as is described in the related application, and transmits the thus-organized samples serially over line 6A.

The largest part of each frame transmitted over line 6A consists of samples of the signals on high-speed data lines 202A; the multiplexing unit 4A samples these lines much more frequently than it does the other lines. But small portions of each frame contain samples from the other lines and particularly from lines 203A, and a demultiplexing unit 16B (FIG. 2B) in chip 1005B extracts these samples and transmits them serially as a signal SR OUT B on line 502B to a shift register 504B that, like shift register 504A, is operated as a serial-to-parallel converter. An SR OUT CLOCK B signal on line 411B clocks the information on line 502B into the serial-to-parallel converter 504B, and, when the data have been properly aligned with output control lines 508B, an S R ENABLE B signal on Line 506B latches those data and transmits them over control lines 508 B. Circuit 504B accordingly presents on its output lines 508B the control information that appeared on input control lines 203A of FIG. 2A.

Control information on input control lines 203B in FIG. 2B are transmitted in an identical manner to control lines 508A of FIG. 2A through the operation of parallel-to-serial converter 208B and serial-to-parallel converter 504A, which are identical to elements 208A and 504B, respectively.

According to one aspect of the present invention, each of the external shift registers 208A and B and 504A and B, to which the overwhelming majority of the input and output lines of the system are connected, can be made longer or shorter in accordance with, e.g., the number of computer systems to be served, and this lengthening or shortening can occur without any adjustment in the operation of the main concentrator/deconcentrator chips 1005A and B and without changing the correspondence between conductors of lines 203A and 502B. The manner in which this is achieved is described in more detail in connection with FIGS. 3 and 4. Before beginning the discussion of those drawings, however, we will describe the remaining elements of FIGS. 2A and 2B.

The signals on high-speed data lines 202A are one set of inputs to a switch 206A, which ordinarily is in a state in which it forwards these signals on lines 2A to the multiplexing unit 4A for transmission in the manner described in the related application. The demultiplexing unit 16B of FIG. 2 reconstitutes the input signals from lines 202A as corresponding output signals on lines 18B of FIG. 2B, which a corresponding switch 1028B ordinarily forwards over lines 1030B as output data signals. Similarly, input data signals on lines 202B from FIG. 2B ordinarily reappear as output data signals on line 1030A in FIG. 2A by a similar operation of multiplexing unit 4B, demultiplexing unit 16A, and switches 206B and 1028A.

This is the normal operation of the system, but a user at, for instance, location B may want to determine for diagnostic purposes that location A is actually receiving what location B is sending. As will be described in more detail in connection with FIG. 5, the user can do this by transmitting on one of the lines 65B a LOOPBACK B signal, which, after optical transmission, shows up on line 552A in location A and is forwarded by an asynchronous signal release (ASR) circuit to switches 1028A and 206A to cause them to switch from their normal states. The multiplexing and demultiplexing units 4A and 16A control the response to the LOOPBACK B signal so that switching does not occur at an inappropriate time, such as in the middle of a bit pulse. The latches and other circuitry for performing this function are depicted simply as asynchronous-signal-release blocks while necessary control lines from the multiplexing and demultiplexing units 4A and 16A are omitted for the sake of simplicity.

When LOOPBACK B is asserted, switch 1028A diverts the data signals received on lines 18A to lines 1046A, which carry the other set of inputs to switch 206A. In its changed state, switch 206A forwards the diverted data, rather than those from lines 202A, onto line 2A. In other words, when the user at location B sends the LOOPBACK B signal, the main concentrator/deconcentrator chip 1005A at location A merely returns to location B the data that chip 1005B at location B sent to it.

The remainder of the discussion of FIGS. 2A and 2B concerns various error-detection and other housekeeping information exchanged between the two locations. The demultiplexing unit 16A extracts such information from the signals on line 14A and transmits it over lines 242A to diagnostic logic 1046A, which generates user information on lines 1018A in response, as will be described in more detail in connection with FIG. 5. It also generates signals that it transmits to asynchronous signal-release mechanisms 1032A and 1033A, which forward those signals on lines 1038A and 1041A to the transmission section, where they join user-controlled housekeeping and diagnostic signals on lines 1022A and 1020A to form input lines 65A and 48A of multiplexing unit 4A. The signals on these lines also will be described in more detail in connection with FIG. 5.

We now turn to a discussion of the manner in which the communications system 1000 affords the beneficial modularity in parallel-to-serial converters 208A and 208B and in the corresponding serial-to-parallel converters 504A and 504B without affecting the operation of the main concentrator/deconcentrator chips 1005A and B. As will be explained presently, this result is achieved by transmitting the shift-register data in an order that is, in a sense, "reversed."

Figure 3:
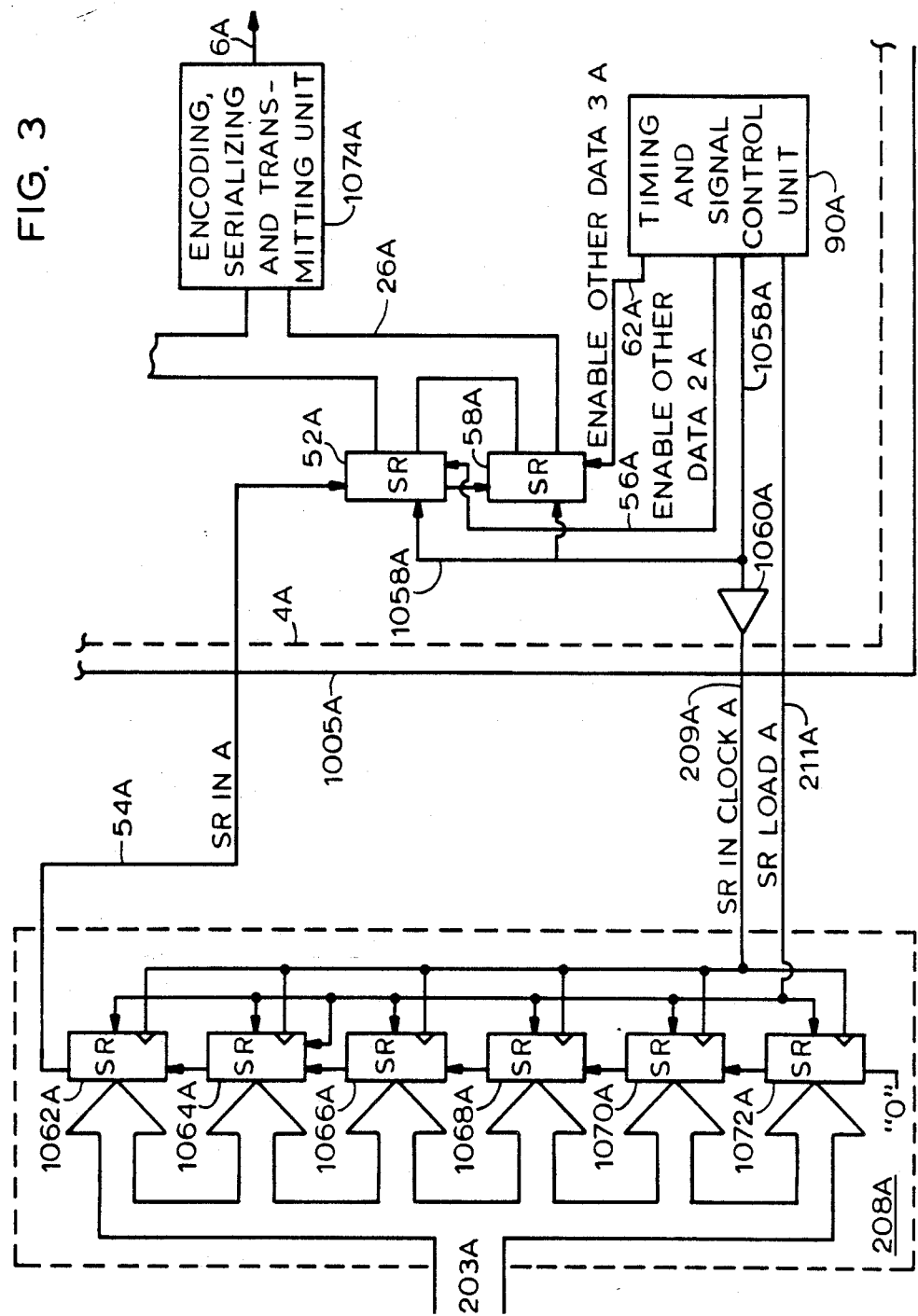
FIG. 3 is a schematic diagram of the shift register and related circuitry for sampling the serial binary data interchange circuit control lines from a plurality of computer system units (not shown) and for feeding those samples into a VLSI chip that includes the multiplexing unit of a concentrator/deconcentrator system.
Figure 4:
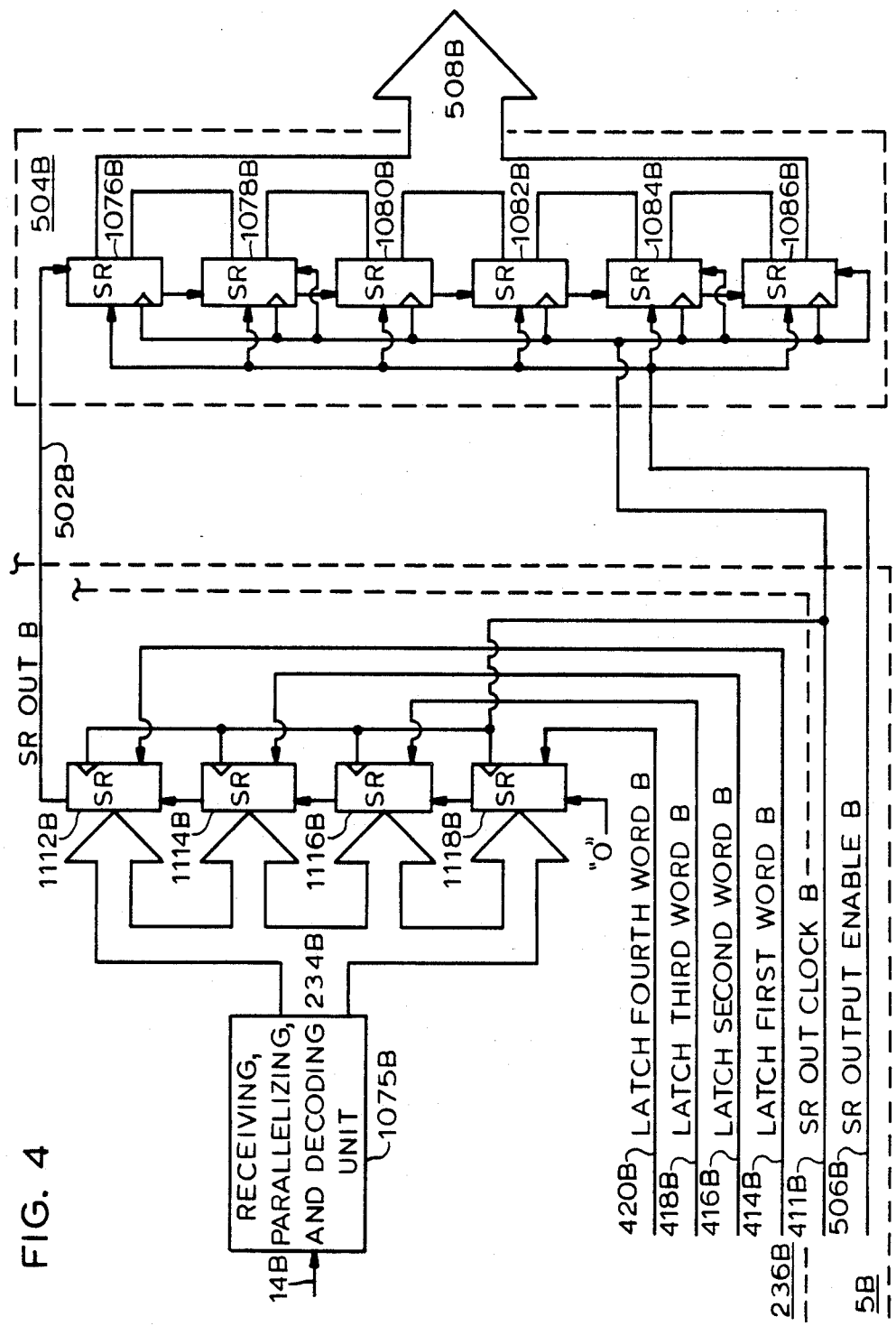
FIG. 4 is a schematic diagram of the circuit for feeding to other units (not shown) the samples of the serial binary data interchange circuit control lines from a VLSI chip that includes the demultiplexing unit of a concentrator/deconcentrator system.

FIGS. 3 and 4 depict parallel-to-serial converter 208A and serial-to-parallel converter 504B, respectively. As was indicated above, the parallel-to-serial converter 208A of FIG. 3 receives ninety-six control lines 203A in the illustrated embodiment. It samples the signals on these control lines, and the resultant contents are ultimately transmitted by the multiplexer unit 4A, which intersperses the control information among data and other information. The organization of the information that the multiplexing unit 4A transmits is described in more detail in the related application, which describes the way in which the information is organized in frames of three different sizes, the smallest-sized frame being referred to as a "subframe," the largest being referred to as a "superframe," and the intermediate-sized frame being referred to simply as a "frame." There are four subframes in a intermediate-sized frame and three intermediate-sized frames in a superframe. Not all subframes contain control information, and, while all of the intermediate-sized frames contain some control information, each intermediate-sized frame contains information from only one-third of the lines 203A that carry control information to the parallel-to-serial converter 208A. A superframe contains information from all of the lines 203A.

Ninety-six-stage shift register 208A includes six sixteen-stage component shift registers 1062A, 1064A, 1066A, 1068A, 1070A, and 1072A connected in a series so that the serial output port of component shift register 1062A serves the serial output port of the composite shift register 208A. As was described above, the contents of these shift registers are transmitted to location B so that they are ultimately entered in shift register 504B of FIG. 4, which itself comprises six series-connected sixteen-bit shift registers 1076B, 1078B, 1080B, 1082B, 1084B, and 1086B. The circuitry of FIG. 3 serially transmits the contents of the composite shift register 208A in groups of thirty-two bits.

According to the present invention, the desired modularity is afforded by transmitting the groups in an order reverse to that of the shift-register stages into which they were initially loaded. That is, the circuitry of FIG. 3 first transmits the contents of the component shift registers 1070A and 1072A farthest from the serial output port of shift register 208A so that they end up in the component shift registers 1084B and 1086B farthest from the serial input part of shift register 504B. It similarly transmits the other groups in an order reverse to that of their proximity to the serial output port.

Specifically, the contents of the most-remote shift registers 1070A and 1072A are transmitted during the first intermediate-sized frame of each superframe, those of the middle two shift registers 1066A and 1068A are transmitted during the second, and those of the closest two shift registers 1062 and 1064 are transmitted during the third. This reverse-order transmission has the advantage that it retains the correspondence between the input lines 203A and the output lines 508B when one or more component registers in the two composite shift registers 208A and 504B are removed.

This transmission order is implemented as follows. Before the beginning of each of the three frames of a superframe, a timing and signal-control unit 90A in multiplexing unit 4A asserts the SR LOAD A signal on line 211A. This causes the shift register 208A to enter the values of the signals at its input ports into its corresponding internal stages when an SR IN CLOCK A pulse occurs. SR LOAD A is then deasserted, and subsequent SR IN CLOCK A pulses cause shift register 208A to advance its contents along its stages and through its output port so that they appear as the signal SR IN A on line 54A. Another composite shift register consisting of two serially connected sixteen-bit shift registers 52A and 58A receives the SR IN A signal at its serial input port, and it loads in the values of this signal on the occurrences of pulses in an unbuffered version of SR IN CLOCK A on line 1058A. When this operation is performed in connection with the first intermediate-sized frame in a superframe, SR IN CLOCK A pulses ninety-six times and then stops. This many clock pulses cause all of the contents of shift register 208A to enter shift registers 52A and 58A, but, since those registers together hold only thirty-two bits, only the contents of the most remote component registers 1070A and 1072A remain; the rest are lost. The timing-and-signal-control unit 90A then awaits the times within a frame at which an encoding, serializing, and transmitting circuit 1074A needs those contents for transmission. (FIG. 3 of the related application describes the encoding, serializing, and transmitting circuitry 1074A in greater detail.)

Two such times occur in each intermediate-sized frame. When the first such time within a frame occurs, the timing-and-signal-control unit 90A transmits an ENABLE OTHER DATA 2 A signal to shift register 52A, which drives its contents onto a 16-bit bus 26A from which the encoding, serializing, and transmitting circuitry 1074A draws data for transmission. Circuit 1074A accordingly transmits those contents over line 6A to location B. The timing-and-signal-control unit 90A then releases ENABLE OTHER DATA 2 A and awaits the second time within the frame at which control contents are to be transmitted. When that time arrives, it sends ENABLE OTHER DATA 3A, which causes the other shift register 58A to drive its contents onto bus 26A for transmission. During the first intermediate-sized frame, therefore, the encoding, serializing, and transmitting circuitry transmits the contents of component shift registers 1070A and 1072A only, the contents of shift register 1072A being sent first.

In connection with the second frame, the timing-and-signal-control unit 90A again causes shift register 208A to sample the signals on lines 203A, but this time it advances those contents into shift registers 52A and 58A by only sixty-four stages. Consequently, shift registers 52A and 58A contain the information originally loaded into the two intermediate component shift registers 1066A and 1068A, respectively, so it is these contents that are transmitted during the second intermediate-sized frame.

The same operation occurs in connection with the third intermediate-sized frame with the exception that the contents are advanced by only thirty-two stages so that it is the content of component shift registers 1062A and 1064A that circuit 1074A transmits.

It will be appreciated that only one-third of the contents of each sample is transmitted and the others are discarded. This is acceptable because the signals on lines 203A are over-sampled, and updating only once every third sample is sufficient t transfer the entire information content of those lines.

At the receiving end depicted in FIG. 4, receiving, deserializing, and decoding circuitry 1075B, which is described in more detail in the related application, receives all of the information serially transmitted over the fiber-optic cable, and it extracts the control information for entry into shift register 504B. In principle, circuit 1075B could send the control information directly to shift register 504B. For reasons involving the particular encoding technique employed by the illustrated embodiment and described in the related application, however, circuit 1075B instead partially deserializes the incoming control contents into four-bit words, which it places on a bus 234B.

A timing-and-signal-control unit 90B, not shown, operates a series of serially connected four-bit shift registers 1112B, 1114B, 1116B, and 1118B by means of signals on lines 411B, 414B, 416B, 418B, and 420B to latch four serially transmitted four-bit words into respective ones of shift registers 1112B, 1114B, 1116B, and 1118B. With an SR OUT CLOCK B signal on line 411B, the timing-and-signal-control unit then advances these contents over line 502B to shift register 504B. Of course, shift registers 1112B, 1114B, 1116B, and 1118B together contain only 16 bits, so they have to be reloaded six times in order to fill shift register 504B completely. When they have been reloaded six times and the resulting content have been shifted into shift register 504B, the timing-and-signal-control unit asserts the SR OUTPUT ENABLE B signal on line 506B to cause shift register 504B to latch those contents and drive them onto lines 508B. The signals originally present on the input control lines 203A of FIG. 3 thereby appear on output control lines 508B of FIG. 4.

Since it was the contents of the most-remote shift registers 1070A and 1072A of FIG. 3 that were transmitted first, it is those contents that enter shift register 504B first, so it is those contents that ultimately reside in the shift registers 1084B and 1086B most remote from the serial input port of shift register 504B. Similarly, the contents of shift registers 1066A and 1068A ultimately reside in shift registers 1080B and 1082B, while the contents of shift registers 1062A and 1064A, which are closest to the serial output port of shift register 208A, ultimately reside in shift registers 1076B and 1078B, which are closest to the serial input port of shift register 504B.

As was stated above, a benefit of the reverse transmission of the contents on shift register 208A is that it allows one to change the numbers of input and output control lines 203A and 508B without changing the correspondence between them and without changing the operation of the main concentrator/deconcentrator chips 1005A and 1005B To appreciate this, consider the difference between "forward" transmission and the "reverse" transmission just discussed. With reverse transmission, there is a correspondence between, for example, the lines connected to the input ports of register 1066A and those connected to the output ports of register 1080B. This correspondence survives even if three component shift registers 1068A, 1070A, and 1072A are removed from composite shift register 208A and the corresponding component shift registers 1082B, 1084B, and 1086B are removed from shift register 504B. This follows from the fact that the control information is transmitted in reverse order: the information that is first out of the parallel-to-serial converter 208A is the last to be entered into serial-to-parallel converter 504B.

If the contents were transferred in the "forward" direction, on the other hand, register 1066, for example, would initially correspond to register 1082B rather than to register 1080B. The problem with this correspondence is that it cannot be maintained if three shift registers are removed from each of shift registers 208A and 508B. This problem results from the fact that, since the shift-register modules have to be connected in series, removal of component registers has to occur at the end remote from the serial output terminal of the parallel-to-serial converter and at the end remote from the serial input terminal of the serial-to-parallel converter.

When the three most-remote modules are removed from both shift registers, therefore, the three modules in FIG. 4 with which the three remaining modules in FIG. 3 had corresponded are no longer there, and the three modules of FIG. 3 with which the three remaining modules of FIG. 4 had corresponded are no longer there, either. Thus, in order to have input lines correspond to output lines, it is necessary to change the correspondence, and this would require a change in the operation of the main concentrator/deconcentrator chips 1005A and 1005B.

In contrast, if the control information is sent in reverse, no such adjustment is necessary, because the modules correspond in accordance with their remoteness from their respective serial input and output ports.

Moreover, this reversal is achieved largely by selective clocking of the shift register in the parallel-to-serial converter 208A of FIG. 3; chips 1005A and 1005B do not need to include enough registers to hold all of the control contents in reversed form. Chip 1005A does, of course, have registers 52A and 58A for holding a part of those contents after they are transferred to the chip, but those registers do not have to be large enough to contain a complete sample of all the control lines in reverse order. Instead, their sizes are determined by factors such as protocol requirements and required sampling rates and can be as small as those factors permit.

In the illustrated embodiment, the samples taken by shift register 208A are transmitted over the fiber-optic link 10 in an order strictly in reverse to the shift-register stages into which they were loaded. That is, any given bit is transmitted before all other bits that were initially loaded into stages closer to the output port of shift register 208A than the stage into which the given bit was initially loaded. It should be apparent, however, that the advantages of the invention can be realized in an arrangement in which that order is not strictly observed but instead is observed only to the level of the desired modularity.

For instance, suppose that all of the contents of component shift register 1072A are transmitted before the contents of shift register 1070A. This is consistent with the reverse-order scheme described above. But suppose further that the contents initially loaded into the stages of shift register 1072 are transmitted in the forward order, i.e., that within shift register 1072 the contents of the stages closer to the shift-register serial output port are transmitted sooner.

In such a situation, the benefits of the invention are retained because the shift-register length is to be changed by only complete component shift registers. Indeed, the contents of shift register 1070A could be transmitted before the contents of shift register 1072A—so long as the contents of both were transmitted before the contents of any other—if the capacity were intended to be changed only in increments of two component shift registers. In this way, transmission would still occur generally in reverse order even though contents within individual groups are transmitted in forward order.

Figure 5:
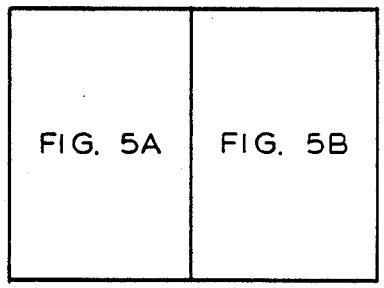
FIGS. 5, 5A, and 5B together constitute a schematic block diagram of a portion of the system depicted in FIG. 2 and show individual constituent conductors in the FIG. 2 link that carry housekeeping and diagnostic signals.
Figure 5A:
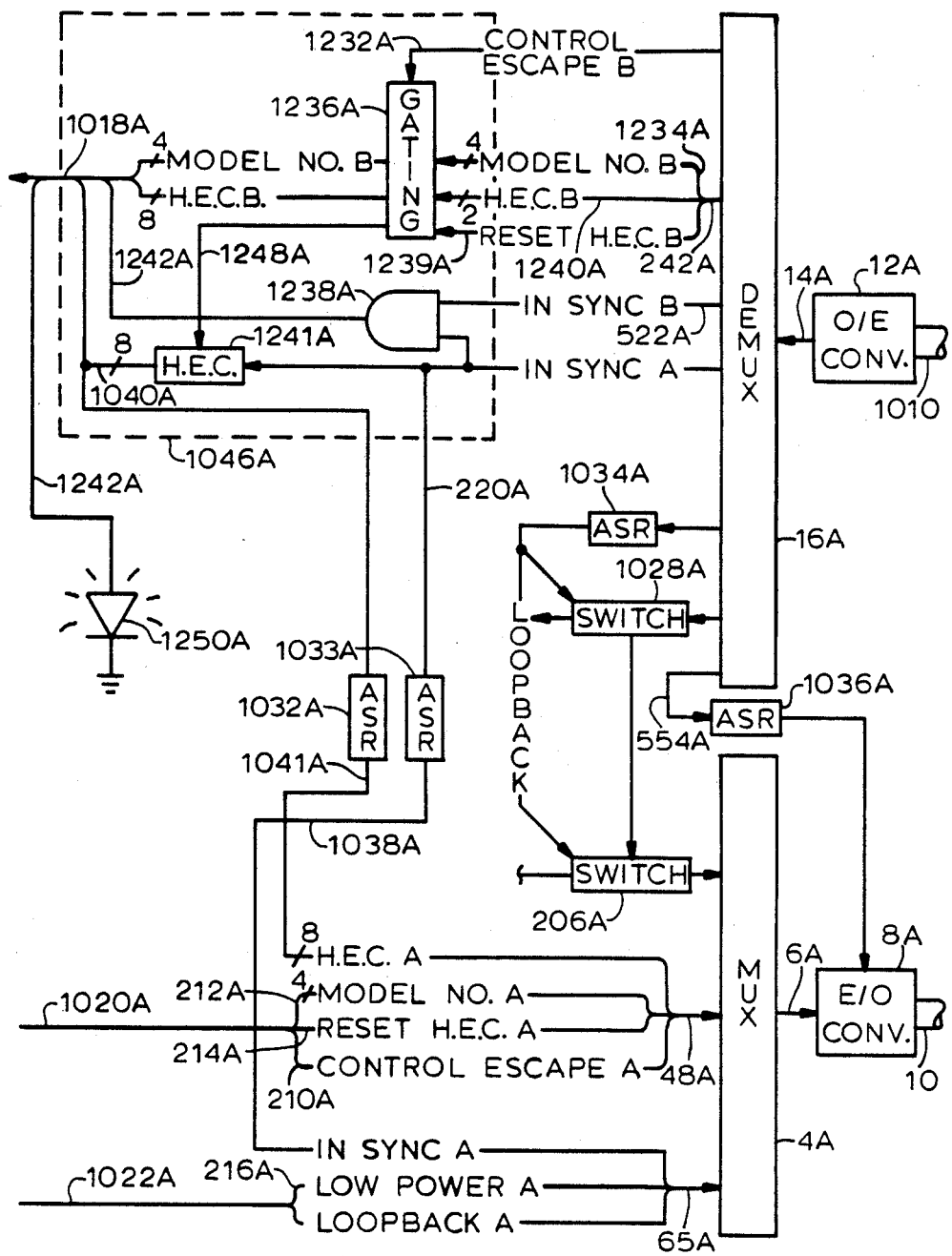
Figure 5B:
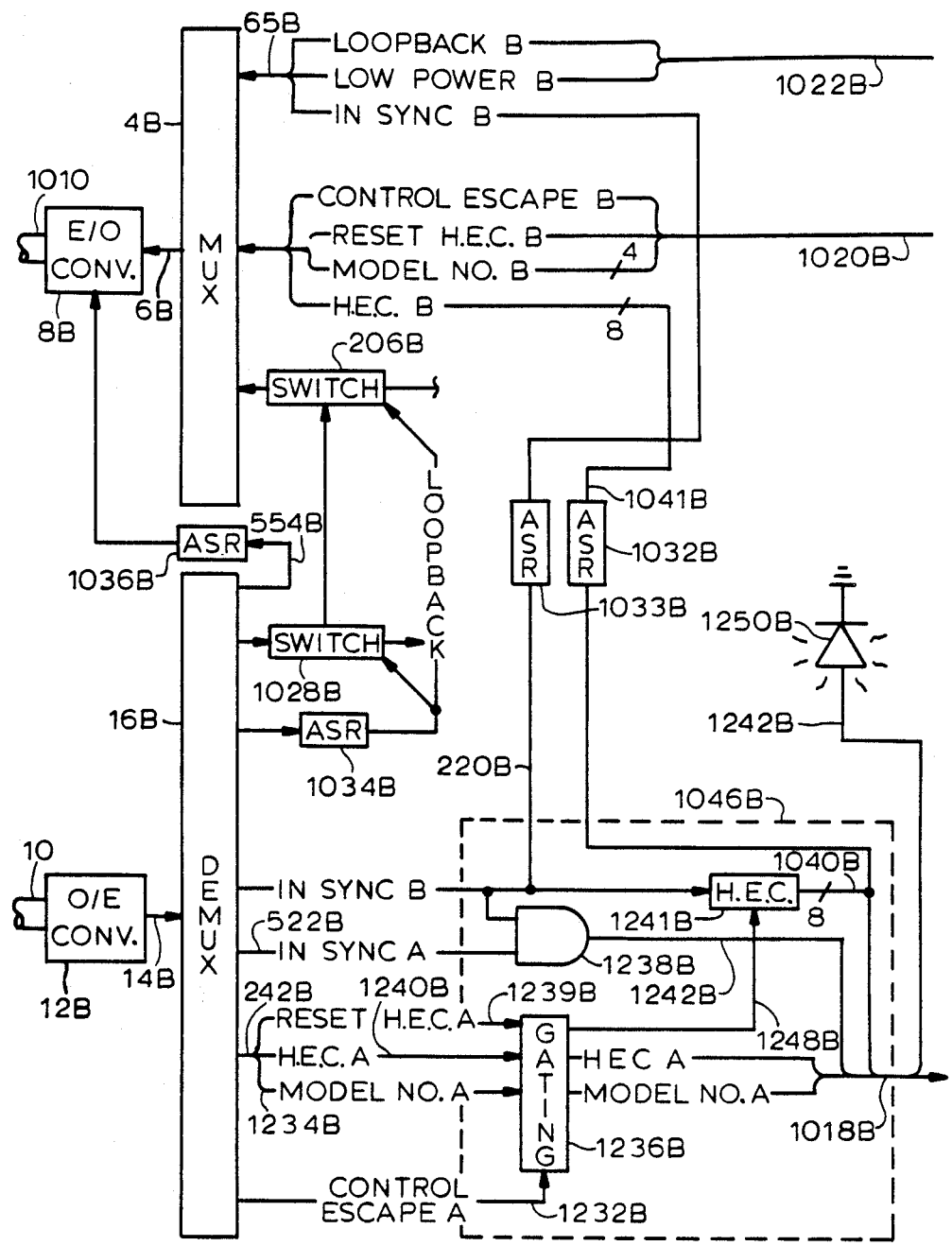

FIGS. 5, 5A, and 5B are similar to FIGS. 2, 2A, and 2B, but FIGS. 5A and 5B largely omit the control and data lines and instead depict the individual conductors in the multi-conductor lines 1018A and B, 1020A and B, and 1022A and B that carry diagnostic and housekeeping information sent and received by the user. FIGS.

5A and 5B also show individual conductors in other lines related to the housekeeping functions and depict the diagnostic logic circuits 1046A and B in greater detail.

As described in greater detail in the related application, the receiver in demultiplexing unit 16A includes circuitry that determines whether its receiver is in synchronism with the bit stream in the transmitter signal that fiber-optic cable 1010 carries. This circuitry produces on line 220A a synchronism signal IN SYNC A ("IN SYNC" in the related application), which indicates whether the receiver is in synchronism or not. As FIG. 5 shows, line 220A carries IN SYNC A to an asynchronous signal release unit 1033A. When the IN SYNC A signal is released by that unit, it travels to the multiplexing unit 4A over line 1038A, which forms part of lines 65A. The value of this signal is incorporated in the signal on line 6A as the value of the Rem Sync bit, which is the synchronism-indicating message mentioned in the related application.

The Rem Sync bit thus carries the value of the IN SYNC A signal to location B. When logic within the demultiplexing unit 16B releases the value received as the Rem Sync bit, it becomes IN SYNC A at location B on line 522B. A similar process culminates in generation of the IN SYNC B signal on line 522A at location A.

The two signals IN SYNC A and IN SYNC B convey the synchronization status of the paired system to users at both ends of the paired system. If each end is in synchronization with its incoming signal, and if the receiver at each end is releasing the bit indicating that other receiver is in synchronization, then gates 1238A and B drive respective light-emitting diodes 1250A and B in the user circuits to indicate that both ends are in synchronization. Otherwise, the light-emitting diodes will not light.

If the lack of synchronization lasts for more than a predetermined duration, the demultiplexing units 16A and 16B will conclude that the link is faulty and will therefore place de-asserted levels continuously on line 18 and 502. That is, even if demultiplexing unit 16A is in synchronism with the signal that it receives and could thus place its contents on lines 18 and 502, it does not do so if the synchronism message in that signal has indicated for more than the predetermined duration that the receiver at the other end of the link has been out of synchronism. Instead, it produces a string of the de-asserted level on those lines, which the computer units at location A should interpret as a link interruption. Similarly, the demultiplexer at the other end, being out of synchronism, generates the same output. In this way, units at both ends of the link recognize a link interruption even though the lack of synchronism occurs in only one direction.

One of the diagnostic features of the link is a hard-error-count circuit 1241B, which counts the number of "hard errors" the demultiplexing unit 16B experiences. It increments its count each time the signal IN SYNC B is deasserted from a previously asserted state. As described in the related application, once demultiplexing unit 16B has asserted IN SYNC B, it deasserts IN SYNC B only if a combination of violations of synchronization requirements has occurred. The hard-error-count circuit 1241B counts such deassertions—considered "hard errors"—to provide a diagnostic record of the number of times such hard errors have occurred. This count is the HARD ERROR COUNT B signal, which appears on eight parallel lines 1040B. Another hard-error-count circuit 1241A at location A produces an analogous HARD ERROR COUNT A signal.

HARD ERROR COUNT B is provided to chip output terminals and to an asynchronous signal-release unit 1033B, which forwards it to multiplexing unit 4B by way of line 1041B. After transmission to location A, this signal appears on lines 1240A, which conduct it to a gating circuit 1236A. Gating circuit 1236A forwards HARD ERROR COUNT B to chip terminals under circumstances described below.

The hard-error-count circuit 1241B at location B resets its count to zero in response to a command from a user at location A. The user asserts a RESET H.E.C. A signal on line 214A, which shows up after transmission to location B as a signal of the same name on line 1239B. Gating circuit 1236B normally forwards this signal over line 1248B to the hard-error-count circuit 1241B, which is thereby reset to zero. The hard-error-count circuit 1241A at location A can be similarly reset in response to commands from location B.

The modularity in accommodating control signals inherently provided by the invention may lead to a situation in which a concentrator section provides for a number of control signals different from that provided for by a deconcentrator section.

If the concentrator section provides for more control signals than the deconcentrator section, the deconcentrator section will lose some of those signals through overflow in a shift register in unit 504. Similarly, if the concentrator section provides for fewer control signals than the deconcentrator section, then the extra control signal lines which the deconcentrator section provides (but which are unused) may be set to any desired level (although it may be preferable to set them to the deasserted state).

Although the EIA standards mentioned above are usually implemented so that certain missing control signals do not preclude transmitting information, it may in some applications be useful or convenient to be able to determine from one end of a paired communications system what the configuration of the remote end of the system actually is.

To this end, the user at location A supplies a four-bit MODEL NO. A signal over lines 212A to multiplexer unit 4A. Unit 4A transmits the value of MODEL NO. A to location B, where it appears on lines 1234B. Under circumstances described below, a gating circuit 1236B forwards this signal to the user at location B by way of chip terminals of chip 1005B. The user at location B can similarly signal the location B configuration to the user at location A.

As was mentioned above, gating circuit 1236B forwards its received signals only under certain circumstances. Those circumstances are that the user at location A has not asserted on line 210A a CONTROL ESCAPE A signal, which appears on line 1232B after transmission to location B and controls the state of gating circuit 1236B. The user at location B can similarly control the use of the MODEL NO. B, H.E.C. B, and RESET H.E.C. B signals that originate at location B.

The CONTROL ESCAPE signals are provided to increase protocol flexibility in the illustrated embodiment. It may become desirable in the future to transmit other control information in addition to that contained in the signals already provided. If that happens, the additional information can alternate with the hard-error count in the slot that is occupied in the basic design by the hard-error count exclusively. By asserting CONTROL ESCAPE in a given frame, the link hardware at one end can alert the hardware at the other end that the hard-error-count slot in the current frame contains the additional information, not the hard-error count.

One way of assessing the reliability of a communications link is to test the link under worse than normal conditions. A user at one location (location A, for example) may test the outbound link from location A to location B by using means not shown to reduce the output power of the electrical-to-optical converter 8A and then monitoring the IN SYNC B signal to determine whether demultiplexing unit 1B continues to receive valid frames. If the IN SYNC B signal remains high even after the output power of electrical-to-optical converter 8A is reduced, it is likely that the optical link from location A to location B will perform reliably when the electrical-to-optical converter 8A is operating at normal power.

A user at location A may also test the optical link from location B to location A. To do this, he sets the output power of the electrical-to-optical converter 8A to normal so that commands sent from location A will be reliably received at location B. Then the user at location A asserts a LOW POWER A command over line 216A. As a result, the transmitter at location A includes in its transmitter signal a mode-request message that represents a request for a low-power mode. The receiver at location B monitors the transmitter signal for this message and places its contents in a mode signal on line 554B. An asynchronous signal release circuit 1036B forwards the mode signal to electrical-to-optical converter 8B, which, in response, switches to a low-power mode, in which its optical output power is reduced. If the demultiplexer 16A continues to receive valid frames—that is, if the IN SYNC A signal continues to be asserted—then the link test is successful, and there is a high likelihood that the link from location B to location A will perform reliably when electrical-to-optical converter 8B is operating at full power. A user at location B can perform similar tests.

The foregoing description has been limited to a specific embodiment. It will be apparent, however, that variations and modifications may be made to the illustrated embodiment, with the attainment of some or all of the advantages of the invention. Therefore, it is the object of the appended claims to cover all such variations and modifications as come within the true spirit and scope of the invention.

What is claimed as new and desired to be secured by Letters Patent of the U.S. is:

1. For providing communication between first and second locations, a communications link comprising:
   A. a signal conductor for conducting transmitter signals from the first location to the second location;
   B. a data concentrator located at the first location and coupled to the signal conductor for serially transmitting transmitter signals containing data in frame periods over the signal conductor, the data concentrator comprising:
      i. a parallel-input shift register having a serial output port, a plurality of sets of stages including a last stage, and, associated with each stage, a parallel input port for receiving a respective signal, the parallel-input shift register being operable selectively to (a) load into each stage the value of the signal received by its associated input port and (b) advance the stage contents from one stage to the next toward the serial output port and generate at the serial output port a serial output signal representing the contents of the last stage; and
      ii. reversing means, connected to receive the serial output signal, for (a) operating the parallel-input shift register to load the values of the signals at the parallel input ports into the stages, advance the stage contents, and thereby transfer those stage contents to the reversing means and (b) generating and applying to the signal conductor a transmitter signal containing those contents serially in an order within a frame period reversed from the order of the sets of stages with which are associated the input ports at which the parallel-input shift registers received those contents; and
   C. a data deconcentrator for receiving the transmitted data and forwarding in parallel to the predetermined destinations the data transmitted during a single frame period.

2. A data link as defined in claim 1 wherein:
   A. the parallel-input shift register is organized in groups of adjacent stages; and
   B. the reversing means includes:
      i. operating means for operating the parallel-input shift register to load its stages N times for each frame period and to advance its contents a different number of stages after each loading for a given frame period, the number of stages advanced after the nth loading for each frame period being sufficient to transfer to the reversal means only the contents of the $N-n+1$ groups of stages closest to the serial output port, where N is an integer greater than one and n is a positive integer less than or equal to N; and
      ii. forwarding means for forwarding to the predetermined destinations, after the nth loading, the contents of the group $(N-n+1)$th closest to the serial output port if there are at least $N-n+1$ groups.

3. A data link as defined in claim 2 wherein:
   A. the reversing means includes a serial-input shift register, connected to receive the serial output signal and including a plurality of stages, for advancing along its stages the contents represented by the serial output signal and storing those contents in its stages; and
   B. the forwarding means forwards the contents of the serial-input shift register after each loading of the parallel-input shift register.

4. For providing communication between first and second locations, a communications link comprising:
   A. a first signal conductor for conducting transmitter signals from the first location to the second location;
   B. a second signal conductor for conducting transmitter signals from the second location to the first location;
   C. first and second receivers located at the first and second locations, respectively, and respectively coupled to the second and first signal conductors to receive the transmitter signals and respectively forward to respective data destinations first and second receiver signals containing at least a portion of the data contained in the transmitter signals that the first and second receivers respectively receive, the first receiver including means for determining whether the first receiver is in synchronism with the transmitter signal that it receives and for generating a first-receiver synchronism signal to represent the result of that determination; and D. first and second transmitters, located at the first and second locations, respectively, and adapted to receive transmission data, for generating transmitter signals representing the transmission data and for transmitting those transmitter signals over the first and second signal conductors, respectively, the first transmitter being responsive to the first-receiver synchronism signal to include in its transmitter signal a synchronism-indicating message that indicates whether the first receiver is in synchronism, wherein the second receiver includes means responsive to the synchronism-indicating message for determining whether the second receiver is in synchronism with the transmitter signal that it receives and for replacing the transmitter-signal data in the second receiver signal with interruption data indicative of a link interruption both when the second receiver has been out of synchronism for a predetermined duration with the transmitter signal that it receives and when the synchronism-indicating message indicates that the first receiver has been out of synchronism for a predetermined duration with the transmitter signal that it receives.

5. A communications link as defined in claim 4 wherein:
A. the second receiver includes means for determining whether the second receiver is in synchronism with the transmitter signal that it receives and for generating a second-receiver synchronism signal to represent the result of that determination; and
B. the second transmitter is responsive to the second-receiver synchronism signal to include in its transmitter signal a synchronism-indicating message that indicates whether the second receiver is in synchronism.

6. A communications link as defined in claim 5 wherein:
the means in the first receiver for determining whether the first receiver is in synchronism with the transmitter signal that it receives is responsive to the synchronism-indicating message in that transmitter signal to replace the transmitter-signal data in the first receiver signal with interruption data indicative of a link interruption both when the first receiver has been out of synchronism for a predetermined duration with the signal that it receives and when the synchronism-indicating message that the first receiver receives indicates that the second receiver has been out of synchronism for a predetermined duration with the transmitter signal that it receives.

7. For providing communication between first and second locations, a communications link comprising:
A. a first signal conductor for conducting signals from the first location to the second location;
B. a second signal conductor for conducting signals from the second location to the first location;
C. first and second transmitters, located at the first and second locations, respectively, and adapted to receive transmission data, for transmitting, over the first and second signal conductors, respectively, transmitter signals representing the transmission data, the first transmitter being operable in a regular mode, in which it transmits its transmitter signal at a regular power level, and in a low-power mode, in which it transmits its transmitter signal at a lower power level, and being adapted to receive a mode signal selectively indicating one of the regular mode and the low-power mode and being responsive to the mode signal to assume the mode indicated by the mode signal, the second transmitter being operable to include in its transmitter signal a mode-request message selectively requesting one of the regular mode and the low-power mode; and D. first and second receivers located at the first and second locations, respectively, and respectively coupled to the second and first signal conductors to receive the transmitter signals and respectively forward first and second receiver signals representative of at least a portion of the data contained in the transmitter signals that the first and second receivers respectively receive, the first receiver including means for monitoring the signal that it receives for the mode-request message and being responsive thereto to generate and apply to the first transmitter a mode signal representing the mode requested by the mode signal.

8. A data link as defined in claim 7 wherein the signal conductors are fiber-optic cables and the transmitter signals that the transmitters transmit and the receivers receive are optical signals.

9. A communications link as defined in claim 7 wherein:
A. the second transmitter is operable to include in its transmitter signal a loopback message selectively requesting one of a loopback mode and non-loopback mode;
B. the first receiver further includes means for monitoring the transmitter signal that it receives for the loopback message and for responding to the loopback message to generate a loopback signal; and
C. the communications link further includes loopback means, located at the first location and coupled to the first transmitter and receiver for reception of the receiver signal from the first receiver and adapted to receive transmission data from a data source, the loopback means being operable in a non-loopback mode, in which it forwards the data in the receiver signal to a data destination and applies the transmission data to the transmitter, and in a loopback mode, in which it applies the data in the receiver signal to the first transmitter as its transmission data, the loopback means being responsive to the loopback signal to assume the mode indicated thereby,
whereby a user at the second location can assess the reliability of the link by operating the second transmitter to include in its transmitter signal loopback and mode-request messages that request the loopback and low-power modes and then comparing the data content of the second receiver signal with that of the first transmitter signal.

10. A data link as defined in claim 9 wherein the signal conductors are fiber-optic cables and the transmitter signals that the transmitters transmit and the receivers receive are optical signals.

11. A communications link as defined in claim 7 wherein:

A. the second transmitter is operable in a regular mode, in which it transmits the transmitter signal at a regular power level, and in a low-power mode, in which it transmits the transmitter signal at a lower power level, and is adapted to receive a mode signal selectively requesting one of the regular mode and the low-power mode and being responsive to the mode signal to assume the mode indicated by the mode signal;

B. the first transmitter is operable to include a mode-request message in its transmitter signal selectively requesting one of the regular mode and the low-power mode; and C. the second receiver includes means for monitoring the signal that it receives for the mode-request message and being responsive thereto to generate and apply to the second transmitter a mode signal representing the mode requested by the mode signal.

12. A data link as defined in claim 11 wherein the signal conductors are fiber-optic cables and the transmitter signals that the transmitters transmit and the receivers receive are optical signals.

13. A communications link as defined in claim 11 wherein:

A. the first and second transmitters are operable to include in their respective transmitter signals loopback messages selectively requesting one of a loopback mode and a non-loopback mode;

B. the first and second receivers include means for monitoring the transmitter signals that they respectively receive for the loopback messages and for responding thereto to generate first and second loopback signals, respectively; and C. the communications link further includes first and second loopback means, located at the first and second locations, respectively, adapted to receive transmission data from a first and second data sources, respectively, and coupled to the first transmitter and receiver and the second transmitter and receiver, respectively, for reception of the first and second receiver signals, respectively, from the first and second receivers, respectively, the first and second loopback means being operable in (i) respective normal modes, in which the first and second loopback means forward the data in the first and second receiver signals, respectively, to first and second data destinations, respectively, and apply the transmission data from the first and second data sources, respectively, to the first and second transmitters, respectively, and (ii) respective loopback modes, in which the first and second loopback means apply the data in the first and second receiver signals, respectively, to the first and second transmitters, respectively, as their transmission data, the first and second loopback means being responsive to the first and second loopback signals, respectively, to assume the respective modes indicated thereby.

14. A data link as defined in claim 13 wherein the signal conductors are fiber-optic cables and the transmitter signals that the transmitters transmit and the receivers receive are optical signals.

15. For providing communication between first and second locations, a communications link comprising:

A. a first signal conductor for conducting signals from the first location to the second location;

B. a second signal conductor for conducting signals from the second location to the first location;

C. first and second transmitters, located at the first and second locations, respectively, and adapted to receive transmission data, for transmitting, over the first and second signal conductors, respectively, transmitter signals representing the transmission data, the first transmitter being operable by application thereto of a hard-error-count signal representing a count to include in the transmitter signal transmitted thereby a hard-error-count message representative of that count;

D. first and second receivers located at the first and second locations, respectively, and respectively coupled to the second and first signal conductors to receive the transmitter signals, the first receiver including means for determining whether the first receiver is in synchronism with the transmitter signal that it receives and for generating a synchronism signal to represent the result of that determination; and E. hard-error-count means located at the first location and responsive to the synchronism signal generated thereby to maintain a count of the number of instances, meeting predetermined criteria, in which the synchronism signal indicates lack of synchronism and to apply to the first transmitter a hard-error-count signal representing that count.

16. A communications link as defined in claim 15 wherein:

A. the second transmitter is operable to include a reset message in its transmitter signal; and B. the hard-error-count means is responsive to the reset message in the transmitter signal received by the first receiver to reset that count in response to receipt of the reset signal.

17. A communications link as defined in claim 15 wherein:

A. the second transmitter is operable by application thereto of a second hard-error-count signal representing a second hard-error count to include in the transmitter signal transmitted thereby a hard-error-count message representative of the second hard-error count;

B. the second receiver includes means for determining whether the second receiver is in synchronism with the transmitter signal that it receives and for generating a second synchronism signal to represent the result of that determination; and C. the communications link further includes second hard-error-count means located at the second location and responsive to the synchronism signal generated thereby to maintain a count of the number of instances, meeting predetermined criteria, in which the second synchronism signal indicates lack of synchronism and to apply to the second transmitter a hard-error-count signal representing that count.

18. A communications link as defined in claim 17 wherein:

A. the first and second transmitters are operable to include reset messages in their respective transmitter signals; and B. the first-mentioned and second hard-error-count means are responsive to the reset messages in the transmitter signals received by the first and second receivers to reset, in response to receipt of the reset signal, the counts maintained by the first and second hard-error-count means.

19. A data concentrator for serially transmitting data in frame periods to a deconcentrator that receives the transmitted data and forwards in parallel to predetermined destinations data transmitted during a single frame period, the data concentrator comprising:
- A. a parallel-input shift register having a serial output port, a plurality of stages including a last stage, and, associated with each stage, a parallel input port for receiving a respective signal, the parallel-input shift register being operable selectively to (i) load into each stage the value of the signal received by its associated input port and (ii) advance the stage contents from one stage to the next toward the serial output port and generate at the serial output port a serial output signal representing the contents of the last stage; and
- B. reversing means, connected to receive the serial output signal, for (i) operating the parallel-input shift register to load the values of the signals at the parallel input ports into the stages, advance the stage contents, and thereby transfer those stage contents to the reversing means and (ii) for transmitting those contents serially to the deconcentrator in an order within a frame period generally reversed from the order of the input ports at which the parallel-input shift registers received those contents.

20. A data concentrator as defined in claim 19 wherein:
- A. the parallel-input shift register is organized in groups of adjacent stages; and
- B. the reversing means includes:
  - i. operating means for operating the parallel-input shift register to load its stages N times for each frame period and to advance its contents a different number of stages after each loading for a given frame period, the number of stages advanced after the nth loading for each frame period being sufficient to transfer to the reversal means only the contents of the $N-n+1$ groups of stages closest to the serial output port, where N is an integer greater than one and n is a position integer less than or equal to N; and
  - ii. forwarding means for forwarding to the predetermined destinations, after the nth loading, the contents of the group $(N-n+1)$th closest to the serial output port if there are at least $N-n+1$ groups.

21. A data concentrator as defined in claim 20 wherein:
- A. the revering means includes a serial-input shift register, connected to receive the serial output signal and including a plurality of stages, for advancing along its stages the contents represented by the serial output signal and storing those contents in its stages; and
- B. the forwarding means forwards the contents of the serial-input shift register after each loading of the parallel-input shift register.

22. A transmitter-receiver unit for use at a first location in a communications link that includes a first signal conductor for conducting data-containing signals from the first location to second location, a second signal conductor for conducting data-containing transmitter signals from the second location to the first location, and a similar transmitter-receiver unit disposed at the second location and coupled to the first and second signal conductors for reception of the data-containing transmitter signals from the first signal conductor and transmission of transmitter signals over the second signal conductor, the transmitter-receiver unit comprising:
- A. a transmitter, adapted to receive transmission data and a mode signal that selectively indicates one of a regular mode and a low-power mode, for transmitting, over the first signal conductor, transmitter signals representing the transmission data, the transmitter being operable in a regular mode, in which it transmits its transmitter signal at a regular power level, and in a low-power mode, in which it transmits its transmitter signal at a lower power level, the transmitter being responsive to the mode signal to assume the mode indicated thereby; and
- B. a receiver, coupled to the second conductor to receive the transmitter signal carried thereby, for forwarding to a data destination a receiver signal representative of at least a portion of the data that transmitter signal contains, monitoring the transmitter signal that it receives for a mode-request message that selectively requests regular and low-power modes, and responding thereto to generate and apply to the transmitter a mode signal representing the mode requested by the mode signal.

23. A transmitter-receiver unit as defined in claim 22 wherein the signal conductors are fiber-optic cables and the transmitter signals that the transmitter transmits and the receiver receives are optical signals.

24. A transmitter-receiver unit as defined in claim 22
- A. the receiver further includes means for monitoring the transmitter signal that it receives for a loopback message that selectively requests one of a loopback mode and non-loopback mode and for responding to the loopback message by generating a loopback signal indicative of the contents thereof; and
- B. the transmitter-receiver unit further includes loopback means coupled to the transmitter and receiver for reception of the loopback and receiver signals from the receiver and adapted to receive transmission data from a data source, the loopback means being operable in a non-loopback mode, in which it forwards the data in the receiver signal to a data destination and applies the transmission data to the transmitter, and in a loopback mode, in which it applies the data in the receiver signal to the transmitter as its transmission data, the loopback means being responsive to the loopback signal to assume the mode indicated thereby,
- whereby a user at the second location can assess the reliability of the link by sending over the second signal conductor loopback and mode-request messages that request the loopback and low-power modes and then comparing the data content of the transmitter signal on the second conductor with that of the transmitter signal on the first conductor.

25. A transmitter-receiver unit as defined in claim 24 wherein the signal conductors are fiber-optic cables and the transmitter signals that the transmitter transmits and the receiver receives are optical signals.

26. A transmitter-receiver unit for use at a first location in a communications link that includes a first signal conductor for conducting data-containing signals from the first location to a second location, a second signal conductor for conducting data-containing transmitter signals from the second location to the first location, and a similar transmitter-receiver unit disposed at the second location and coupled to the first and second signal conductors for reception of the data-containing transmitter signals from the first signal conductor and transmission of transmitter signals over the second signal conductor, the transmitter-receiver unit comprising:

A. a receiver for receiving a transmitter signal over the second conductor, the receiver including means for determining whether the receiver is in synchronism with the transmitter signal that it receives and for generating a synchronism signal to represent the result of that determination;

B. hard-error-count means responsive to the synchronism signal to maintain a count of the number of instances, meeting predetermined criteria, in which the synchronism signal indicates lack of synchronism and to apply to the first transmitter a hard-error-count signal representing that count; and C. a transmitter, responsive to the hard-error-count signal and adapted to receive transmission data, for transmitting over the first signal conductor a transmitter signal representing the transmission data and for including in the transmitter signal a hard- error-count message representative of the count that the hard-error-count signal represents.

27. A transmitter-receiver as defined in claim 26 wherein:

A. the transmitter is operable to include a reset message in its transmitter signal; and B. the hard-error-count means is responsive to a reset message in the transmitter signal received by the first receiver to reset that count in response to receipt of the reset signal.

28. A transmitter-receiver unit for use at a first location in a communications link that includes a fist signal conductor for conducting data-containing signals from the first location to a second location, a second signal conductor for conducting data-containing transmitter signals from the second location to the first location, and a similar transmitter-receiver unit disposed at the second location and coupled to the first and second signal conductors for reception of the data-containing transmitter signals from the first signal conductor and transmission of transmitter signals over the second signal conductor, the transmitter-receiver unit comprising:

A. a receiver coupled to the second signal conductor to receive the transmitter signals and forward to a data destination a receiver signal containing at least a portion of the data contained in the transmitter signal that the receiver receives, the receiver including means for determining whether the receiver is in synchronism with the transmitter signal that it receives and for generating a synchronism signal to represent the result of that determination; and B. a transmitter, adapted to receive transmission data, for generating a transmitted signal representing the transmission data and for transmitting that transmitter signal over the first signal conductor, the transmitter being responsive o the synchronism signal to include in its transmitter signal a synchronism-indicating message that indicates whether the receiver is in synchronism, wherein the receiver includes means, responsive to a synchronism message contained in the transmitter signal that it receives and indicative of whether a receiver in the transmitter-receiver unit at the second location is in synchronism with a transmitter signal that it receives, for replacing the transmitter-signal data in the receiver signal with interruption data indicative of a link interruption both when the receiver at the first location has been out of synchronism with the signal that it receives for a predetermined duration and when the synchronism-indicating message indicates that the receiver at the second location has been out of synchronism with the transmitter signal that it receives for a predetermined duration.

29. A transmitter-receiver unit for use at a first location in a communications link that includes a first signal conductor for conducting data-containing transmitter signals from the first location to a second location, a second signal conductor for conducting data-containing transmitter signals from the second location to the first location, and a similar transmitter-receiver unit disposed at the second location and coupled to the first and second signal conductors for reception of the transmitter signals from the first signal conductor and transmission of transmitter signals over the second signal conductor, the transmitter-receiver unit comprising:

A. a receiver for receiving a transmitter signal over the second conductor and forwarding to a data destination a receiver signal containing at least a portion of the data contained in the transmitter signal that the receiver receives, the receiver including means for determining whether the receiver is in synchronism with the transmitter signal that it receives and for generating a synchronism signal to represent the result of that determination, the receiver further including means, responsive to a synchronism message contained in the transmitter signal that it receives and indicative of whether the receiver in the transmitter-receiver unit at the second location is in synchronism with the transmitter signal that it receives, for replacing the transmitter-signal data in the receiver signal with interruption data indicative of a link interruption both when the receiver at the first location has been out of synchronism for a predetermined duration with the transmitter signal that it receives and when the synchronism-indicating message indicates that the receiver at the second location has been out of synchronism for a predetermined duration with the transmitter signal that it receives;

B. hard-error-count means, responsive to the synchronism signal and to a reset message in the transmitter signal, for maintaining a count of the number of instances, meeting predetermined criteria, in which synchronism signal indicates lack of synchronism, for applying to the first transmitter a hard-error-count signal representing that count, and for resetting that count in response to receipt of the reset signal; and C. a transmitter, responsive to the hard-error-count signal and the synchronism signal and adapted to receive transmission data, for transmitting over the first signal conductor a transmitter signal representing the transmission data and for including in the transmitter signal a hard-error-count message representative of the hard-error count and a synchronism-indicating message that indicates whether the first receiver is in synchronism.

30. A transmitter-receiver unit for use at a first location in a communications link that includes a first fiber-optic signal conductor for conducting data-containing transmitter signals from the first location to second location, a second fiber-optic signal conductor for conducting data-containing transmitter signals from the second location to the first location, and a similar transmitter-receiver unit disposed at the second location and coupled to the first and second signal conductors for reception of the transmitter signals from the first signal conductor and transmission of transmitter signals over the second signal conductor, the transmitter-receiver unit comprising:

A. a transmitter, adapted to receive transmission data, a synchronism signal, and a mode signal that selectively indicates one of a regular mode and a low-power mode, for transmitting, over the first signal conductor, optical transmitter signals representing the transmission data, the transmitter being responsive to the synchronism signal to include in its transmitter signal a synchronism-indicating message representing the content of the synchronism signal and being operable in a regular mode, in which it transmits its transmitter signal at a regular power level, and in a low-power mode, in which it transmits its transmitter signal at a lower power level, the transmitter being responsive to the mode signal to assume the mode indicated thereby;

B. a receiver, coupled to the second conductor to receive the transmitter signal carried thereby, for forwarding to a data destination a receiver signal representative of at least a portion of the data that the transmitter signal contains, for monitoring the transmitter signal that it receives for a mode-request message that selectively requests regular and low-power modes, and for responding thereto to generate and apply to the first transmitter a mode signal representing the mode requested by the mode message, the receiver further including:
  i. means for determining whether the receiver is in synchronism with the transmitter signal that it receives and for generating a synchronism signal that represents the result of that determination;
  ii. means for monitoring the transmitter signal that it receives for a loopback message that selectively requests one of a loopback mode and non-loopback mode and for responding to the loopback message by generating a loopback signal indicative of the contents thereof; and
  iii. means, responsive to a synchronism message contained in the transmitter signal that it receives and indicative of whether the receiver in the transmitter-receiver unit at the second location is in synchronism with the transmitter signal that it receives, for replacing the transmitter-signal data in the receiver signal with interruption data indicative of a link interruption both when the receiver at the first location has been out of synchronism for a predetermined duration with the signal that it receives and when the synchronism-indicating message indicates that the receiver at the second location has been out of synchronism for a predetermined duration with the transmitter signal that it receives; and C. loopback means coupled to the transmitter and receiver for reception of the loopback and receiver signals from the receiver and adapted to receive transmission data from a data source, the loopback means being operable in a non-loopback mode, in which it forwards the data in the receiver signal to a data destination and applies the transmission data to the transmitter, and in a loopback mode, in which it applies the data in the receiver signal to the transmitter as its transmission data, the loopback means being responsive to the loopback signal to assume the mode indicated thereby, whereby a user at the second location can assess the reliability of the link by sending over the second signal conductor loopback and mode-request messages that request the loopback and low-power modes and then comparing the data content of the transmitter signal on the second conductor with that of the transmitter signal on the first conductor.

* * * * *